United States Patent
Oishi et al.

(10) Patent No.: US 8,570,422 B2
(45) Date of Patent: Oct. 29, 2013

(54) APPARATUS, METHOD, AND RECORDING MEDIUM CONTAINING PROGRAM FOR PHOTOGRAPHING

(75) Inventors: Makoto Oishi, Miyagi (JP); Masako Suehiro, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 710 days.

(21) Appl. No.: 12/230,512

(22) Filed: Aug. 29, 2008

(65) Prior Publication Data
US 2009/0059054 A1    Mar. 5, 2009

(30) Foreign Application Priority Data

Aug. 30, 2007 (JP) .................................. 2007-223506

(51) Int. Cl.
H04N 5/222 (2006.01)
H04N 5/76 (2006.01)
G03B 17/18 (2006.01)

(52) U.S. Cl.
USPC .............. 348/333.01; 348/231.9; 348/333.02; 348/333.03; 348/333.04; 348/333.05; 348/333.06; 348/333.07; 348/333.08; 348/333.09; 348/333.11; 396/291

(58) Field of Classification Search
USPC ............ 348/333.01–333.11, 207.99; 396/291
See application file for complete search history.

(56) References Cited

U.S. PATENT DOCUMENTS

| | | | |
|---|---|---|---|
| 6,301,440 B1 * | 10/2001 | Bolle et al. | 396/128 |
| 6,317,141 B1 * | 11/2001 | Pavley et al. | 715/732 |
| 7,417,679 B2 | 8/2008 | Kuruma | |
| 7,860,389 B2 | 12/2010 | Hara et al. | |
| 2001/0000970 A1 * | 5/2001 | Ejima | 348/232 |
| 2003/0007076 A1 * | 1/2003 | Okisu et al. | 348/222.1 |
| 2005/0094015 A1 | 5/2005 | Kuruma | |
| 2006/0029381 A1 * | 2/2006 | Onozawa | 396/147 |
| 2006/0216016 A1 * | 9/2006 | Eun | 396/222 |
| 2007/0065137 A1 | 3/2007 | Hara et al. | |
| 2007/0153111 A1 | 7/2007 | Kato | |

FOREIGN PATENT DOCUMENTS

JP    4-115788    4/1992

(Continued)

OTHER PUBLICATIONS

Notice of Reason(s) for Rejection dated Apr. 12, 2011, with English translation.

*Primary Examiner* — Joel Fosselman
(74) *Attorney, Agent, or Firm* — McGinn Intellectual Property Law Group, PLLC

(57) ABSTRACT

A photographing apparatus, such as a digital camera, provided with a scene recognition function is disclosed, in which images photographed according to a photographing mode or color candidate corresponding to a recognized scene are played back according to a predetermined classification. Live view data and actually-photographed image data representing a subject are acquired, and the live view data is analyzed to recognize at least one scene representing the subject. Then, a photographing mode or a color candidate corresponding to the scene is selected. The photographing mode or color candidate selected for each actually-photographed image data is recorded together with the actually-photographed image data acquired according to the selected photographing mode or color candidate. A photographing mode or color candidate for playing back the actually-photographed image data is specified to play back all the actually-photographed image data acquired according to the specified photographing mode or color candidate.

17 Claims, 10 Drawing Sheets

(56) References Cited

FOREIGN PATENT DOCUMENTS

| | | |
|---|---|---|
| JP | 11-331739 A | 11/1999 |
| JP | 2004-120225 | 4/2004 |
| JP | 2005-110097 A | 4/2005 |
| JP | 2005-210411 A | 8/2005 |
| JP | 2006-166337 A | 6/2006 |
| JP | 2007-88662 A | 4/2007 |

* cited by examiner

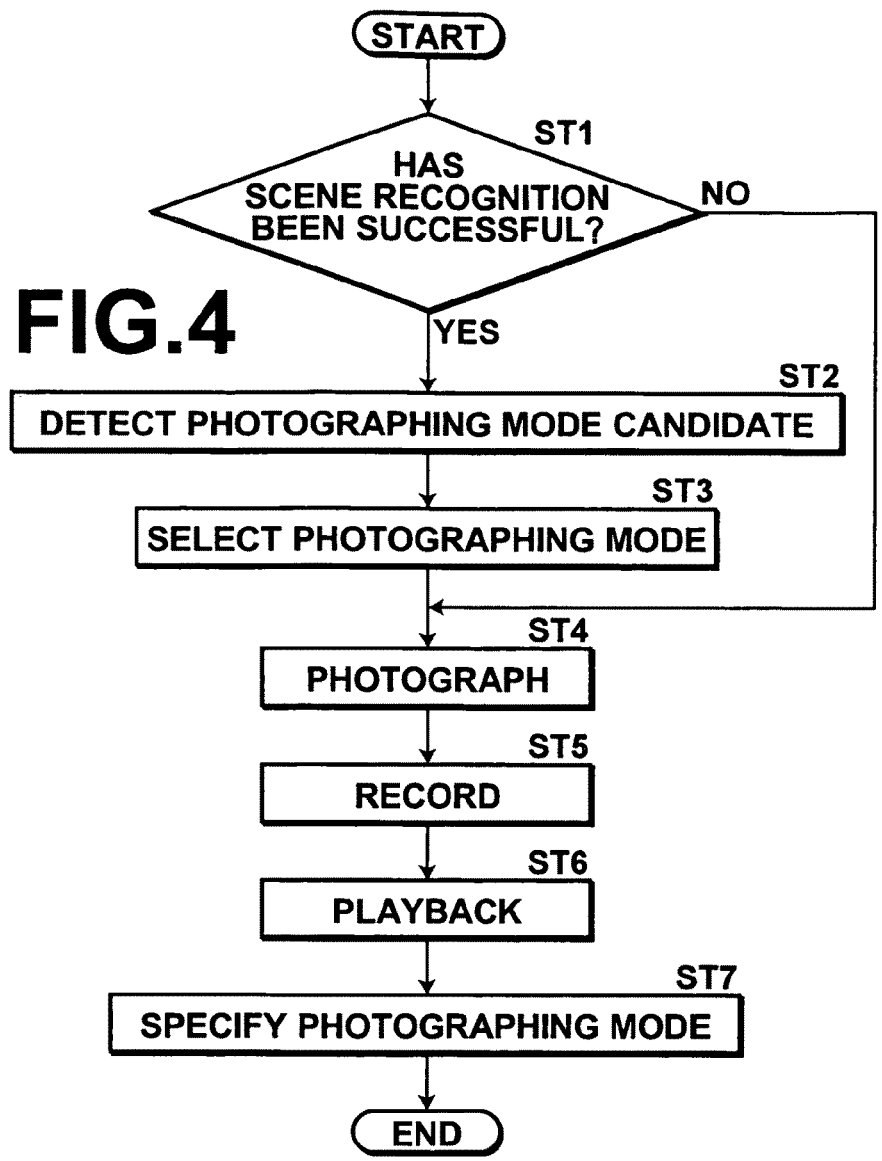
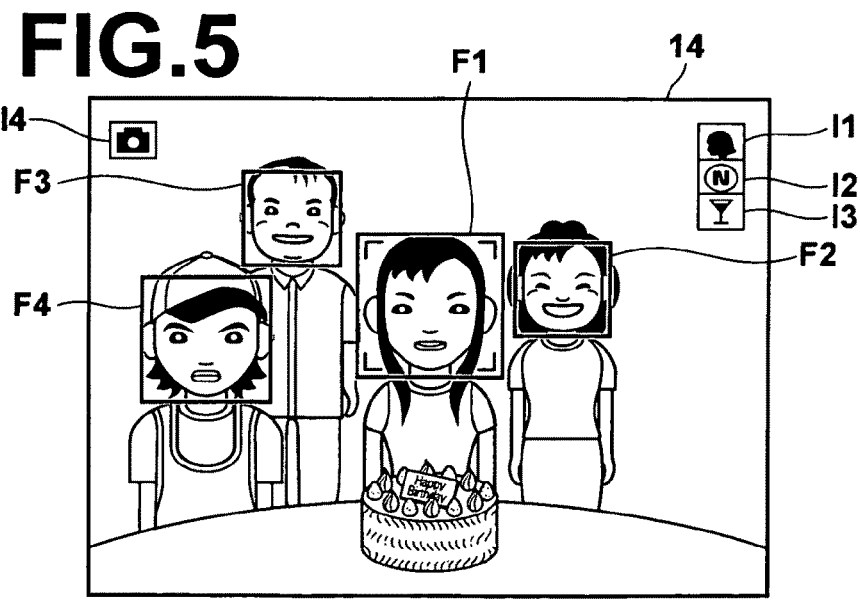

FIG.6
SP1
| LIST OF SCENE POSITIONS | |
|---|---|
| MODE DIAL SETTING | |
|  | NATURAL PHOTO |
|  | HIGH-SENSITIVITY DOUBLE SHOT |
| MENU SETTING | |
|  | PERSON |
|  | BEAUTIFUL SKIN |
|  | LANDSCAPE |
|  | SPORTS |
|  | NIGHT SCENE |
|  | FIREWORK |
|  | SUNSET |
|  | SNOW |
|  | BEACH |
|  | UNDER WATER |
|  | ART MUSEUM |
|  | PARTY |
|  | MACRO PHOTOGRAPHY OF FLOWER |
| TEXT | TEXT |

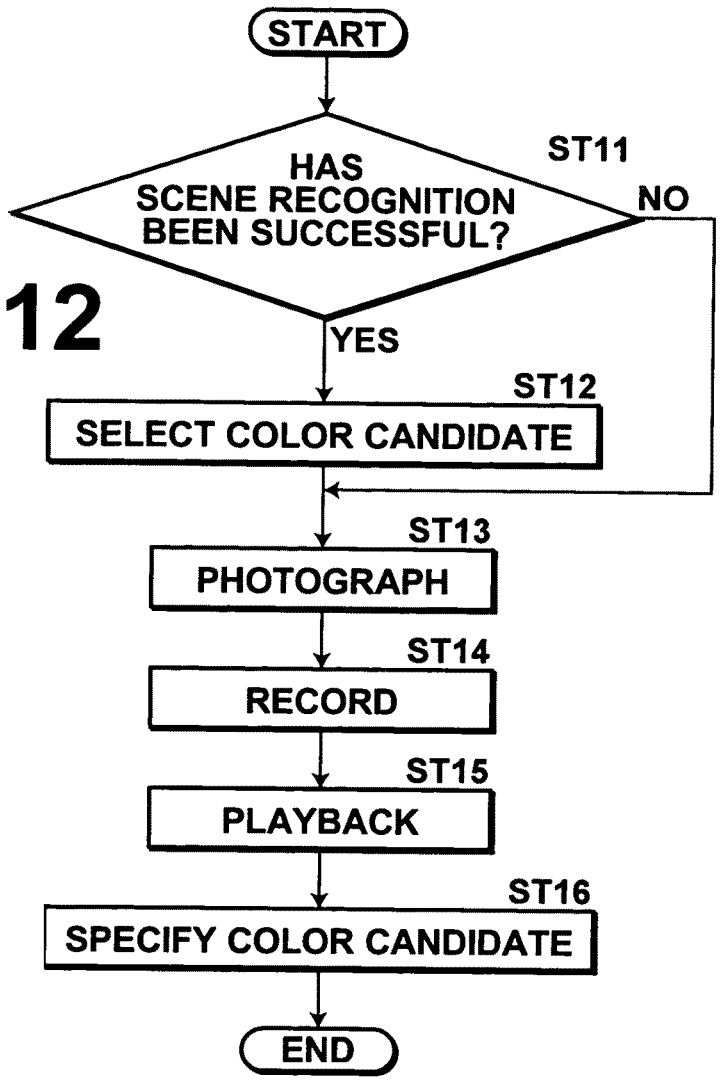
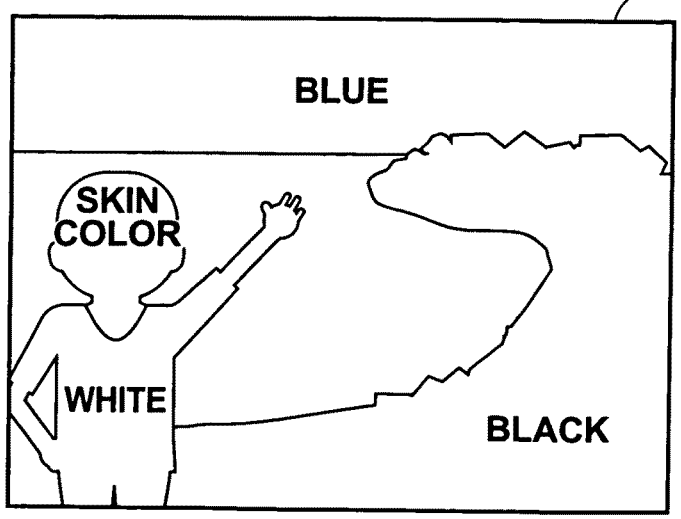

| RESULT OF SCENE RECOGNITION | COLOR CANDIDATE | SCORE |
|---|---|---|
| PERSON | SKIN COLOR | 60 |
| SKY | BLUE | 50 |
| SEA | BLACK | 40 |
| ROCK | ... | ... |
| ... | ... | ... |

T3

| RESULT OF SCENE RECOGNITION | COLOR CANDIDATE | RATIO (%) |
|---|---|---|
| PERSON | SKIN COLOR | 40 |
| SKY | BLUE | 30 |
| SEA | BLACK | 20 |
| ROCK | ... | 10 |
| ... | ... | ... |

T4

APPARATUS, METHOD, AND RECORDING MEDIUM CONTAINING PROGRAM FOR PHOTOGRAPHING

BACKGROUND OF THE INVENTION

1. Field of the Invention

The present invention relates to a photographing apparatus provided with a scene recognition function. The present invention particularly relates to a photographing apparatus, a photographing method and a recording medium containing a photographing program which allow images taken in a photographing mode corresponding to a recognized scene to be played back.

2. Description of the Related Art

In recent years, digital cameras, and the like, which uses a technique to detect and analyze a scene to display a recommended photographing mode on the preview display of the camera according to a result of the scene detection have been proposed (see U.S. Patent Application Publication No. 20070153111). In the camera disclosed in this U.S. Patent Application Publication No. 20070153111, live view data is analyzed to determine a scene, and one or more recommended photographing modes are displayed on the preview display based on the result of scene determination. Then, the user selects one of the displayed photographing modes and photographing is carried out in the selected photographing mode. In a camera disclosed in Japanese Unexamined Patent Publication No. 2004-120225, a photographed image is recorded in a memory card with being associated with photographing mode information that indicates a photographing mode selected via a mode dial during a photographing operation. Then, when the photographed images are played back, image data corresponding to a photographing mode selected via the mode dial can be searched out from a memory card and are displayed on a display unit. In a camera disclosed in Japanese Unexamined Patent Publication No. 4(1992)-115788, a photographed image is recorded together with photographing conditions (for example, white balance, amount of incident light, etc.) during photographing, and when the photographed images are played back, images photographed under photographing conditions corresponding to a certain search question can be outputted.

However, with the technique disclosed in the above U.S. Patent Application Publication No. 20070153111, although a burden on the user in selecting a photographing mode during a photographing operation is reduced, it is difficult to classify and display images according to the scene during a playback operation. Further, to classify images according to the scene during a playback operation, a classification code has to be set for each image, and this requires complicated operations.

With the technique disclosed in the above Japanese Unexamined Patent Publication No. 2004-120225, the user has to select a mode via the mode dial to play back images for each photographing mode corresponding to the mode dial. Further, the user may not be sure which mode should be selected during photographing. Moreover, during a playback operation, images can only be searched with respect to a single photographing mode that corresponds to the mode dial setting.

With the technique disclosed in the above Japanese Unexamined Patent Publication No. 4(1992)-115788, it is necessary to prepare certain search questions during a playback operation, and the user is required to make complicated operations.

SUMMARY OF THE INVENTION

In view of the above-described circumstances, the present invention is directed to providing a photographing apparatus, a photographing method, and a recording medium containing a photographing program which allow image data to be appropriately played back for each classification through simple operations without requiring preparation of certain search questions.

An aspect of the photographing apparatus according to the invention includes: an imaging unit to acquire live view data and actually-photographed image data representing a subject; a scene recognition unit to analyze the live view data acquired by the imaging unit and recognize at least one scene representing the subject; a photographing mode selection unit to select at least one photographing mode defining photographing conditions for the imaging unit, the photographing condition corresponding to the at least one scene recognized by the scene recognition unit; a recording unit to record the at least one photographing mode selected for each actually-photographed image data together with the actually-photographed image data acquired in the photographing mode selected by the photographing mode selection unit; a photographing mode specifying unit to specify a photographing mode for playing back the recorded actually-photographed image data; and a playback controlling unit to search out, from the recording unit, all the actually-photographed image data acquired in the photographing mode specified by the photographing mode specifying unit and allow the searched-out actually-photographed image data to be played back. That is, the image data photographed in the photographing mode corresponding to the recognized scene is recorded with being associated with the photographing mode, and the photographing mode selected during the photographing operation is used for the playback operation, so that the image data for each classification can be played back with simple operations.

The "scene" herein represents the type of the subject, for example, a portion of the subject. The "scene" indicates what the subject relates to, such as a person, landscape, sky, a building or a pet in the image, for example.

The "live view data" herein refers to an image which is continuously taken by the imaging unit before an instruction to acquire the actually-photographed image data is inputted. Specifically, in a digital camera, an image is displayed like a moving image on the monitor of the digital camera before the release button is pressed, and one or more frames forming the moving image correspond to the live view data. The live view data herein also includes image data that is stored in a frame memory when the release button is half-pressed and a CPU detecting a generated half-press signal causes the imaging unit to carry out preliminary photographing.

The "playback controlling unit" herein exerts control such that the photographed live view data or actually-photographed image data is played back. All the actually-photographed image data acquired in the photographing mode specified by the photographing mode specifying unit may be searched out from the recording unit, and all the searched-out actually-photographed image data may be played back. All the searched-out actually-photographed image data may be played back in the order of photographing date and time or in the order specified by the user. At least one icon corresponding to the at least one photographing mode selected by the photographing mode selection unit may be displayed with being superimposed on the live view data.

The "photographing mode selection unit" herein selects at least one photographing mode defining photographing conditions for the imaging unit before the actual photographing operation. For example, the photographing mode selection unit may automatically set the at least one photographing mode or selects one or more of the at least one photographing mode according to a selection instruction received from the user. The photographing mode selection unit may select the at least one photographing mode corresponding to one or more of the at least one scene in the order of the scene certainty factor from the highest, which is calculated for each scene analyzed by the scene recognition unit, or may select the at least one photographing mode of the number within a predetermined number. The photographing mode selection unit may select the at least one photographing mode corresponding only to one or more of the at least one scene which has a scene certainty factor calculated for each scene analyzed by the scene recognition unit not less than a predetermined value.

The "photographing mode specifying unit" herein refers to a means to specify a particular photographing mode for playing back the recorded actually-photographed image data.

The photographing apparatus of the invention may further include an image processing unit to apply image processing on the actually-photographed image data according to an image processing condition set based on the at least one photographing mode selected by the photographing mode selection unit, and the image processing unit may calculate a component ratio of each of the at least one selected photographing mode and may control the image processing condition according to the component ratio. In this case, the photographing mode specifying unit may be able to receive an instruction from the user for setting the component ratio of the scene.

Another aspect of the photographing apparatus of the invention includes: an imaging unit to acquire live view data and actually-photographed image data representing a subject; a scene recognition unit to analyze the live view data acquired by the imaging unit and recognize at least one scene representing the subject; a color candidate selection unit to select at least one color candidate of the subject based on the at least one scene recognized by the scene recognition unit; a recording unit to record the actually-photographed image data together with the at least one color candidate selected by the color candidate selection unit; a color candidate specifying unit to specify at least one particular color candidate for playing back the recorded actually-photographed image data; and a playback controlling unit to search out, from the recording unit, all the actually-photographed image data corresponding to the particular color candidate specified by the color candidate specifying unit and allows the searched-out actually-photographed image data to be played back. Further, a component ratio of each of the selected at least one color candidate to the entire image may be calculated.

The "color" herein is a part of color components representing the image, such as color components including blue, red, yellow, black, white, violet, light blue, green, orange, etc., in the image.

The "color candidate selection unit" herein selects at least one color candidate corresponding to the recognized scene before the actual photographing operation. For example, the color candidate selection unit may select one or more of the at least one color candidate in the order of a color certainty factor from the highest, which is calculated for each selected color candidate. Further, the color candidate selection unit may select the at least one color candidate of the number within a predetermined number. The color candidate selection unit may select one or more of the at least one color candidate having a color certainty factor, which is calculated for each color candidate, not less than a predetermined value.

An aspect of the photographing method of the invention includes: acquiring live view data and actually-photographed image data representing a subject; analyzing the acquired live view data and recognizing at least one scene representing the subject; selecting at least one photographing mode defining a photographing condition corresponding to the at least one recognized scene; recording the at least one photographing mode selected for each actually-photographed image data together with the actually-photographed image data acquired in the selected photographing mode; specifying a photographing mode for playing back the recorded actually-photographed image data; and searching out all the actually-photographed image data acquired in the specified photographing mode and playing back the searched-out actually-photographed image data.

Another aspect of the photographing method of the invention includes: acquiring live view data and actually-photographed image data representing a subject; analyzing the acquired live view data and recognizing at least one scene representing the subject; selecting at least one color candidate of the subject based on the at least one recognized scene; recording the actually-photographed image data together with the selected color candidate; specifying at least one particular color candidate for playing back the actually-photographed image data; and searching out all the actually-photographed image data corresponding to the specified particular color candidate and allowing the searched-out actually-photographed image data to be played back.

Further, a recording medium containing a program for causing a computer to carry out the photographing method of the invention may be provided.

It should be noted that the photographing apparatus of the invention is not limited to a single-piece apparatus, and encompasses an apparatus which is formed by connecting two or more devices, for example, connecting a photographing apparatus (such as a digital camera) to a display device (such as a television) via a wired or wireless connection.

BRIEF DESCRIPTION OF THE DRAWINGS

FIG. 4 is a flow chart of a series of operations according to the first embodiment, FIG. 5 illustrates an example of display on a monitor of the digital camera according to the first embodiment, FIG. 6 illustrates a list of photographing modes (scene positions) according to the first embodiment, FIG. 12 is a flow chart of a series of operations according to the second embodiment, FIG. 13 illustrates an example of display on the monitor of the digital camera according to the second embodiment.

DESCRIPTION OF THE PREFERRED EMBODIMENTS

Now, a photographing apparatus according to a first embodiment of the present invention will be described in detail with reference to the drawings.

Figure 1:
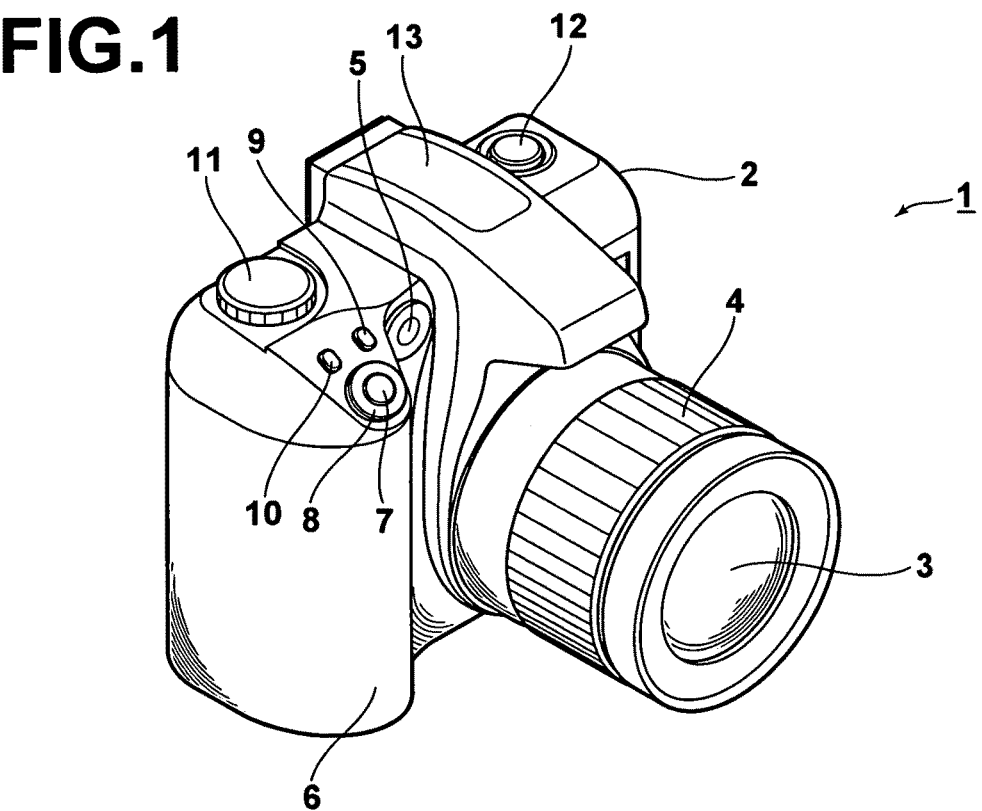
FIG. 1 is a front view of a digital camera.
Figure 2:
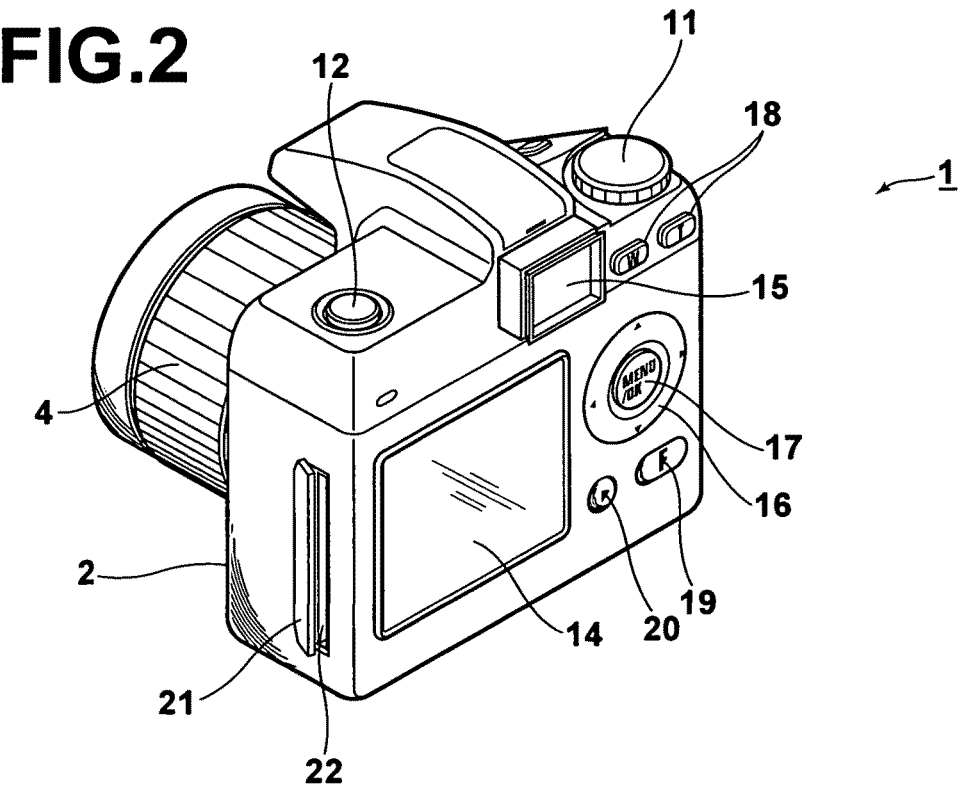
FIG. 2 is a back view of the digital camera.

FIGS. 1 and 2 illustrate one example of the appearance of a digital camera viewed from the front side and the rear side, respectively. As shown in FIG. 2, a digital camera 1 includes, on the rear side of a body 2 thereof, an operation mode dial 11, a menu/OK button 17, a zoom button 18, a four-directional button 16, a display/back button 20, and a photo-mode button 22 as an interface for manipulation by the user, as well as a finder 15 for photographing, a monitor 14 for photographing and playback and a release button 7.

The operation mode dial 11 is a slide switch for switching between photographing modes, such as photographing modes (landscape, night scene, sea, snow, mountain, flower, sunset, party and person, baby, sports, pet, etc.), an automatic scene recognition mode and an automatic scene recognition continuous-shooting mode.

The menu/OK button 17 is a button to be pressed to display on the monitor 14 various menus in turn, such as a menu for selection of photographing mode/color candidate, setting ON/OFF of the self timer, the number of pixels to be recorded, sensitivity of the image pickup device, or the like, or to be pressed to make decision on a selection or setting based on the menu displayed on the monitor 14.

The zoom button 18 allows the user to adjust the telephoto/wide-angle position during a photographing operation by pressing a right or left button of the zoom button 18.

The four-directional button 16 is used to move a cursor up, down, rightward or leftward within the menu screen displayed on the monitor 14 during various setting operations.

The Back button 20 is a button to be pressed to terminate a current setting operation and display a previous screen on the monitor 14. During a playback operation, the Back button 20 also allows the user to change a manner of display on the monitor 14.

The finder 15 is used by the user to see and adjust the picture composition and/or the point of focus during photographing a subject. An image of the subject viewed through the finder 15 is captured via a finder window provided on the front side of the body 2.

The release button 7 is a manual operation button that allows the user to make two-step operations including half-pressing and full-pressing. As the user presses the release button 7, a half-pressing signal or a full-pressing signal is outputted to a CPU 75 via a manipulation system controlling unit 74, which will be described later.

Contents of the setting made by the user through manipulation of the above-described buttons and/or levers can be confirmed via the display on the monitor 14, a lamp within the finder 15, or the like. The monitor 14 serves as an electronic view finder by displaying a live view data for the user to view the subject during photographing. The monitor 14 also displays a playback view of photographed still images or moving images, as well as various setting menus.

As the user half-presses the release button 7, scene recognition processing (which will be described later), and automatic setting such as automatic exposure processing (hereinafter referred to as AE processing) and automatic focusing processing (hereinafter referred to as AF processing) are carried out. As the user fully presses the release button 7, photographing is carried out based on photographing conditions (such as AE processing and AF processing) defined by a photographing mode/color candidate selected according to a result of the scene recognition, and the image displayed on the monitor 14 is recorded as actually-photographed image data.

As shown in FIG. 1, the digital camera 1 further includes, on the front side of the body 2 thereof, an imaging lens 3, a zoom ring 4, a power lever 8, a flash light 13 and an AF assisting light/self timer lamp 5. Further, a media slot 22 is provided on a lateral side of the body 2.

The imaging lens 3 focuses an image of the subject on a predetermined imaging surface (such as a CCD or CMOS provided within the body 2). The imaging lens 3 is formed, for example, by a focusing lens and a zooming lens.

The power lever 8 is used to power on or power off the digital camera 1. The power lever 8 is also used to switch between the operation modes including a still image photographing mode, a moving image photographing mode and a playback mode.

The flash light 13 is used to momentarily emit necessary light for a photographing operation toward the subject when the release button 7 is pressed and while the shutter within the body 2 is open. The flash light 13 is formed by a xenon tube; however, it may be a flash light other than the xenon tube.

The AF assisting light/self timer lamp 5 is provided to inform the subject a timing of opening and closing of the shutter, i.e., the start and the end of exposure, during a photographing operation using a self-timer, and it also serves as an AF assisting lamp that emits light for the AF processing.

The media slot 22 is a port for an external recording medium 70, such as a memory card, to be loaded therein. As the external recording medium 70 is loaded in the media slot 22, writing and reading of data are carried out, as necessary.

Figure 3:
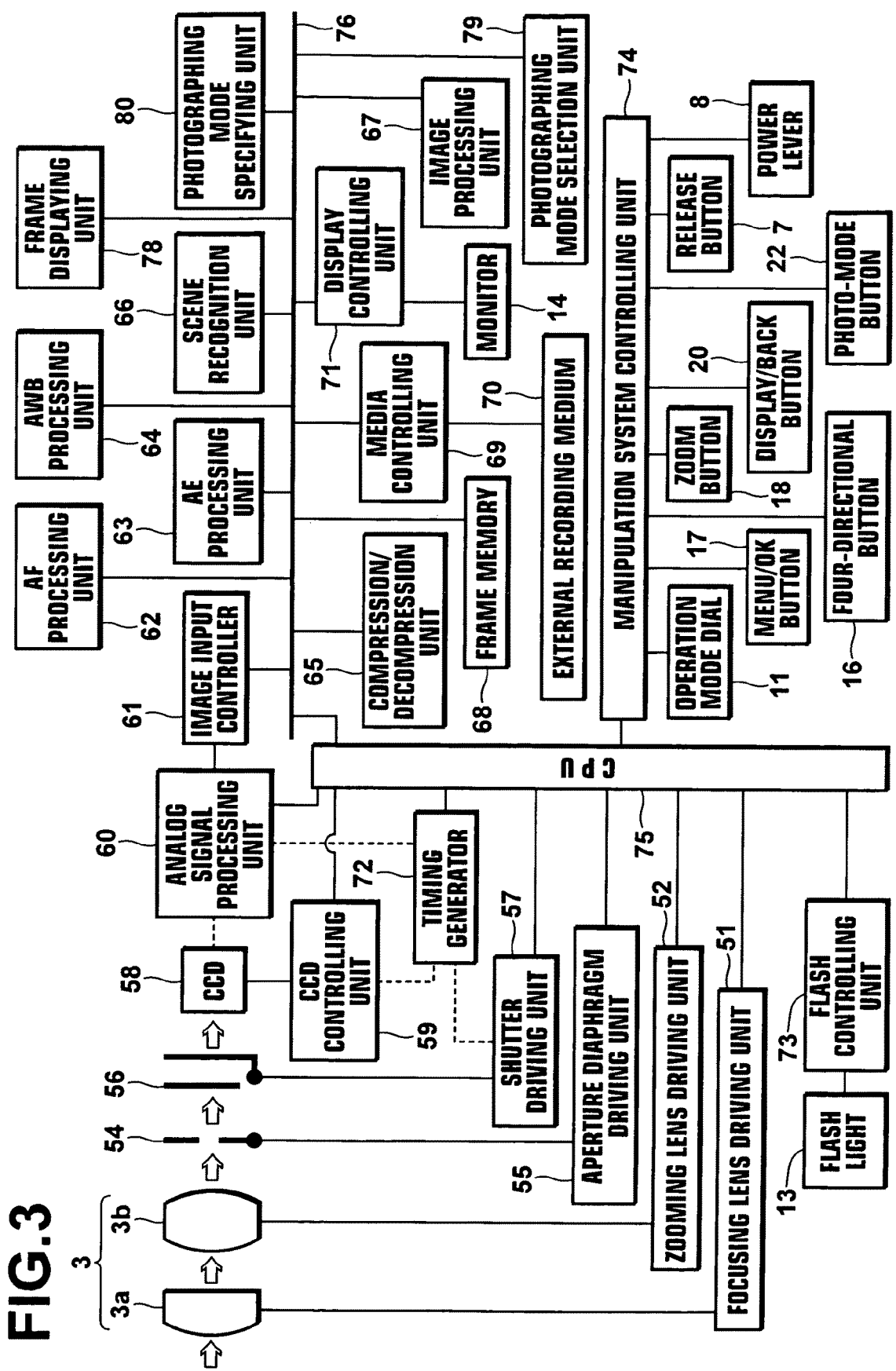
FIG. 3 is a functional block diagram of a digital camera according to a first embodiment.

FIG. 3 is a block diagram illustrating the functional configuration of the digital camera 1. As shown in FIG. 3, as a manipulation system of the digital camera 1, the operation mode dial 11, the menu/OK button 17, the zoom button 18, the four-directional button 16, the display/back button 20, the release button 7, the power lever 8 and the photo-mode button 22, and a manipulation system controlling unit 74 serving as an interface to communicate contents of manipulation of these switches, buttons and/or levers made by the user to the CPU 75 are provided.

Further, a focusing lens 3a and a zooming lens 3b, which form the imaging lens 3, are provided. These lenses are respectively driven stepwise along the optical axis by a focusing lens driving unit 51 and a zooming lens driving unit 52, each formed by a motor and a motor driver.

The focusing lens driving unit 51 drives the focusing lens 3a stepwise based on focusing lens driving amount data outputted from an AF processing unit 62. The zooming lens driving unit 52 controls stepwise driving of the zooming lens 3b based on data representing a manipulation amount of the zoom button 18.

An aperture diaphragm 54 is driven by an aperture diaphragm driving unit 55, which is formed by a motor and a motor driver. The aperture diaphragm driving unit 55 adjusts the aperture diameter of the aperture diaphragm 54 based on aperture value data outputted from an AE processing unit 63.

The shutter 56 is a mechanical shutter, and is driven by a shutter driving unit 57, which is formed by a motor and a motor driver. The shutter driving unit 57 controls opening and closing of the shutter 56 according to a signal that is outputted when the release button 7 is pressed and shutter speed data that is outputted from the AE processing unit 63.

A CCD (imaging unit) 58, which is an image pickup device, is disposed downstream the optical system. The CCD 58 includes a photoelectric surface formed by a large number of light receiving elements arranged in a matrix. An image of the subject passing through the optical system is focused on the photoelectric surface and is subjected to photoelectric conversion. A micro lens array (not shown) for converging the light at respective pixels and a color filter array (not shown) formed by regularly arrayed R, G and B color filters are disposed upstream the photoelectric surface.

The CCD 58 reads electric charges accumulated at the respective pixels line by line and outputs them as an image signal synchronously with a vertical transfer clock signal and a horizontal transfer clock signal, which are supplied from a CCD controlling unit 59. A time for accumulating the charges at the pixels (i.e., an exposure time) is determined by an electronic shutter driving signal supplied from the CCD controlling unit 59.

The image signal outputted from the CCD 58 is inputted to an analog signal processing unit 60. The analog signal processing unit 60 includes a correlation double sampling circuit (CDS) for removing noise from the image signal, an automatic gain controller (AGC) for controlling a gain of the image signal, and an A/D converter (ADC) for converting the image signal into digital image data. The digital image data is CCD-RAW data, which includes R, G and B density values of the respective pixels.

A timing generator 72 generates timing signals. The timing signals are inputted to the shutter driving unit 57, the CCD controlling unit 59 and the analog signal processing unit 60, thereby synchronizing the manipulation of the release button 7 with opening/closing of the shutter 56, transfer of the electric charges of the CCD 58 and processing by the analog signal processing unit 60.

The flash controlling unit 73 controls emission of the flash light 13 so that flash light of an amount according to a flash emission amount calculated by a flash emission amount controlling unit (not shown) is emitted.

An image input controller 61 writes the CCD-RAW data, which is inputted from the analog signal processing unit 60, in a frame memory 68. The frame memory 68 provides a workspace for various digital image processing applied to the actually-photographed image data or the live view data, which will be described later. The frame memory 68 is formed, for example, by a SDRAM (Synchronous Dynamic Random Access Memory) that transfers data synchronously with a bus clock signal of a constant frequency.

A display controlling unit 71 causes the image data stored in the frame memory 68 to be displayed on the monitor 14 as the live view data. The display controlling unit 71 converts the image data into a composite signal by combining a luminance (Y) signal and chromatic (C) signals together and outputs the composite signal to the monitor 14. The live view data is taken at predetermined time intervals and is displayed on the monitor 14 while the photographing mode is selected. The display controlling unit 71 also causes an image, which is based on the image data contained in the image file stored in the external recording medium and read out by a media controlling unit 69, to be displayed on the monitor 14.

The scene recognition unit 66 analyzes the type of a scene to be photographed (such as landscape, night scene, sea, snow, mountain, flower, sunset, party and person, baby, sports, pet, or the like) based on the live view data or the actually-photographed image data photographed by the digital camera 1.

One example of a technique for analyzing a scene used by the scene recognition unit 66 in the photographing apparatus of the invention is disclosed, for example, in Japanese Unexamined Patent Publication No. 2005-310123 (hereinafter referred to as reference 1). The technique disclosed in reference 1 uses multiple classifiers to discriminate images of particular scenes with taking into account tendency of positions of characteristic features in the live view data of interest corresponding to a desired particular scene and variations of such positions and area ratios due to differences in framing, or the like. Recognition of the particular scene is indicated by a threshold of a particular classifier or a sum of more than one thresholds. It should be noted that a scene certainty factor, which indicates a probability of the scene being a particular scene, can be calculated from the threshold of a particular classifier or the sum of more than one thresholds.

Further, a technique disclosed in Japanese Unexamined Patent Publication No. 2005-122720 (hereinafter referred to as reference 2) can be used in the photographing apparatus of the invention. The technique disclosed in reference 2 uses reference data stored in a memory. The reference data defines types of feature quantities and discrimination conditions used for discriminating each of scenes which may be specified as particular scenes. In this technique, all feature quantities used for discriminating the scenes which may be specified as the particular scenes are derived from the live view data to be discriminated. Then, the types of feature quantities defined by the reference data is referenced depending on a specified particular scene, and the corresponding feature quantities are derived from the live view data to be discriminated. Then, the discrimination conditions contained in the reference data are referenced based on the derived feature quantities, and whether or not the image data to be discriminated is image data of the particular scene is recognized based on predetermined thresholds, or the like. It should be noted that the scene certainty factor, which indicates a probability of the scene being a particular scene, can be calculated from the predetermined thresholds or the discrimination conditions.

Further, the scene recognition unit 66 may detect a person's face from the live view data or the actually-photographed image data. Specifically, a region having features of a face (such as a region having a skin color, having eyes, having a shape of a face, and the like) may be detected as a face region.

For example, a technique disclosed in Japanese Unexamined Patent Publication No. 2006-202276 (hereinafter referred to as reference 3) can be used in the photographing apparatus of the invention. In the technique disclosed in reference 3, face tracking may use a known technique such as motion vector or feature point detection, or a machine learning technique based on Adaboosting, which is a technique to generate an integrated learning machine by sequentially updating weights on learning data at each time of resampling, and finally integrating the generated machines with the weights on the leaning machines. With this technique, for example, when a frame model of a face is generated by fitting an average frame model in an actual face image and moving positions of landmarks in the average frame model to positions of corresponding landmarks detected from the face to deform the average frame model, positions of points indicating the landmarks are detected from the face image using classifiers, which have been obtained through a learning operation based on a machine learning technique using luminance profiles of points on sample images which are known in advance to be predetermined landmarks and luminance profiles of points on sample images which are known in advance not to be the landmarks, and classification conditions for the respective classifiers.

Furthermore, a technique disclosed in Japanese Unexamined Patent Publication No. 2004-334836 (hereinafter referred to as reference 4) can be used in the photographing apparatus of the invention. The technique disclosed in reference 4 uses a method for extracting a characteristic feature from image data, in which image data having a certain size is cut from image data, and the cut image data is compared with matching data of characteristic feature image data to detect whether or not the image of interest contains the characteristic feature image. It should be noted that a technique disclosed in Japanese Unexamined Patent Publication No. 2007-011970 (hereinafter referred to as reference 5) may be applied to the photographing apparatus of the invention to detect, for example, an animal face region in the live view data as a particular subject, in addition to a person's face region.

In the above-described face detection technique, not only a front face but also a side face can be detected.

The AF processing unit 62 detects the focal positions of a face recognized by the scene recognition unit 66 within each tracking frame (see F1-F4 in FIG. 5) displayed by a frame displaying unit 78 and outputs the focusing lens driving amount data. In this embodiment, a passive method is used for detecting the focused focal point. The passive method utilizes the fact that a focused image has a higher focus evaluation value (contrast value) than unfocused images. Alternatively, an active method which uses a result of distance measurement by a distance measuring sensor (not shown) may be used.

The AE processing unit 63 measures a brightness of the subject within each tracking frame (see F1-F4 in FIG. 5) displayed by the frame displaying unit 78, and then determines an aperture value, a shutter speed, and the like, based on the measured brightness of the subject, and outputs data of the determined aperture value and shutter speed.

The image processing unit 67 applies, to the image data of the actually-photographed image, image quality correction processing, such as gamma correction, sharpness correction, contrast correction and color correction, and YC processing to convert the CCD-RAW data into YC data formed by Y data representing a luminance signal, Cb data representing a blue color-difference signal and Cr data representing a red color-difference signal. The actually-photographed image data is processed according to image processing conditions which are set based on one or more photographing modes selected by the photographing mode selection unit 79. Further, in a case where a component ratio between one or more photographing modes selected by the photographing mode selection unit 79 is calculated to control the image processing conditions depending on the component ratio, the photographing mode selection unit 79 may receive an instruction from the user to allow the user to set a component ratio between scenes or color candidates.

The actually-photographed image data is an image based on image data of an image signal which is outputted from the CCD 58 when the release button 7 is fully pressed and is stored in the frame memory 68 via the analog signal processing unit 60 and the image input controller 61.

The upper limit for the number of pixels forming the actually-photographed image is determined by the number of pixels of the CCD 58. The number of pixels of an image to be recorded can be changed according to image quality setting made by the user, such as fine or normal. The number of pixels forming the live view data may be smaller than that of the actually-photographed image data and may be, for example, about 1/16 of the number of pixels forming the actually-photographed image data.

The compression/decompression unit 65 compresses the image data, which has been subjected to the image quality correction, and the like, by the image processing unit 67, according to a certain compression format, such as JPEG, and generates an image file. Accompanying information is added to this image file based on corresponding one of various data formats. In the playback mode, the compression/decompression unit 65 reads out the compressed image file from the external recording medium 70, and decompresses the image file. The decompressed image data is outputted to the display controlling unit 71, and the display controlling unit 71 displays an image based on the image data on the monitor 14.

The media controlling unit 69 corresponds to the media slot 22 shown in FIG. 2. The media controlling unit 69 reads out an image file stored in the external recording medium 70 or writes an image file in the external recording medium 70. The CPU 75 controls the individual parts of the body of the digital camera 1 according to manipulation of the various buttons, levers and switches by the user and signals supplied from the respective functional blocks. The CPU 75 also functions as a recording unit to record an image file in an internal memory (not shown).

The photographing mode selection unit 79 carries out selection to automatically set one or more photographing modes which set photographing conditions for the imaging unit before an actual photographing operation, or receives a selection instruction from the user and carries out selection according to the selection instruction. Details of the photographing mode selection unit 79 will be described later.

The photographing mode specifying unit 80 is an inputting means to specify a particular photographing mode for playing back the recorded actually-photographed image data. Details of the photographing mode specifying unit 80 will be described later.

The data bus 76 is connected to the image input controller 61, the processing units 62 to 69 and 78 to 80, and the CPU 75, so that various signals and data are sent and received via the data bus 76.

Next, operations carried out in the digital camera 1 having the above-described configuration during a photographing operation will be described. FIG. 4 is a flow chart illustrating a series of operations carried out in the digital camera 1. As shown in FIG. 4, when the operation mode according to the setting of the operation mode dial 11 is an automatic scene recognition mode and when the user half-presses the release button 7, the CPU 75 causes the scene recognition unit 66 to carry out the scene recognition.

Then, the scene recognition unit 66 determines whether or not the scene recognition has been successful (step ST1). If the scene recognition has not been successful (step ST1: NO), a usual photographing operation is carried out, and the obtained actually-photographed image data is recorded in the external recording medium 70 (step ST5).

In contrast, if it is determined in step ST1 that the scene recognition has been successful (step ST1: YES), the photographing mode selection unit 79 detects one or more photographing modes to be recommended corresponding to the result of the scene recognition by the scene recognition unit 66. Specifically, the scene recognition unit 66 sends the result of the scene recognition according to the above-described technique to the photographing mode selection unit 79. The photographing mode selection unit 79 has a database of a correspondence relationship between one or more scene recognition results and corresponding one or more photographing modes.

The display controlling unit 71 controls display to allow the user to visually check the detected photographing mode(s) to be recommended on the live view data (step ST2). The photographing mode selection unit 79 detects the photographing mode(s) to be recommended from the result of scene recognition. Displaying an indication of the detected photographing mode(s) in this manner helps to reduce the burden on the user in selecting the photographing mode.

The photographing mode selection unit 79 superimposes the indication of the photographing mode(s) to be recommended on the live view data and displays the live view data with the indication on the monitor 14. For example, icons of the photographing modes may be displayed, as designated by I1-I3 in FIG. 5 (I1 designates a person mode icon, I2 designates a natural photo mode (which will be described later) icon and I3 designates a party mode icon). I4 designates an icon indicating that the camera is operating in the photographing mode.

FIG. 6 shows examples of the icons of photographing modes to be recommended corresponding to the scenes. These icons respectively indicate photographing modes which are suitable for photographing scenes such as "person", "beautiful skin", "landscape", "sports", "night scene", "firework", "sunset", "snow", "beach", "underwater", "art museum", "party", "macro photography of flower", and "text", which are contained in the menu setting. The icons shown at "mode dial setting" in FIG. 6 respectively indicate the natural photo mode (to carry out a photographing operation without flash) and a high-sensitivity double shot mode (to carry out a photographing operation with flash and another photographing operation without flash). Displaying the icons of the photographing modes to be recommended facilitates visual confirmation by the user.

It should be noted that the scene recognition unit 66 may obtain the result of scene recognition by using, besides the scene recognition technique, photographing date and time, lightness of the image, a white balance gain factor, positional information based on GPS information, and the like.

Figure 7:
FIG. 7 illustrates an example of display on the monitor for selection of a photographing mode of the digital camera according to the first embodiment.

While the user half-presses the release button 7, the user checks a graphical user interface (hereinafter referred to as a GUI), as shown in FIG. 7, generated by the photographing mode selection unit 79 and displayed on the monitor 14, and then selectively presses the menu/OK button 17 and the four-directional button 16 to select one of the photographing modes.

The user may select a particular photographing mode by turning the operation mode dial 11. Alternatively, the digital camera 1 may automatically select the photographing mode.

The icons corresponding to the photographing modes detected by the photographing mode selection unit 79 may be displayed on the monitor 14 to allow the user to select one or more of them (or select one or more of them by deleting other detected photographing modes).

As described above, the user selects a desired photographing mode from the photographing modes detected by the photographing mode selection unit 79 (step ST3).

When the release button 7 is fully pressed, the actually-photographed image data is obtained by the imaging unit based on the photographing conditions corresponding to the selected photographing mode (step ST4).

Figure 8:
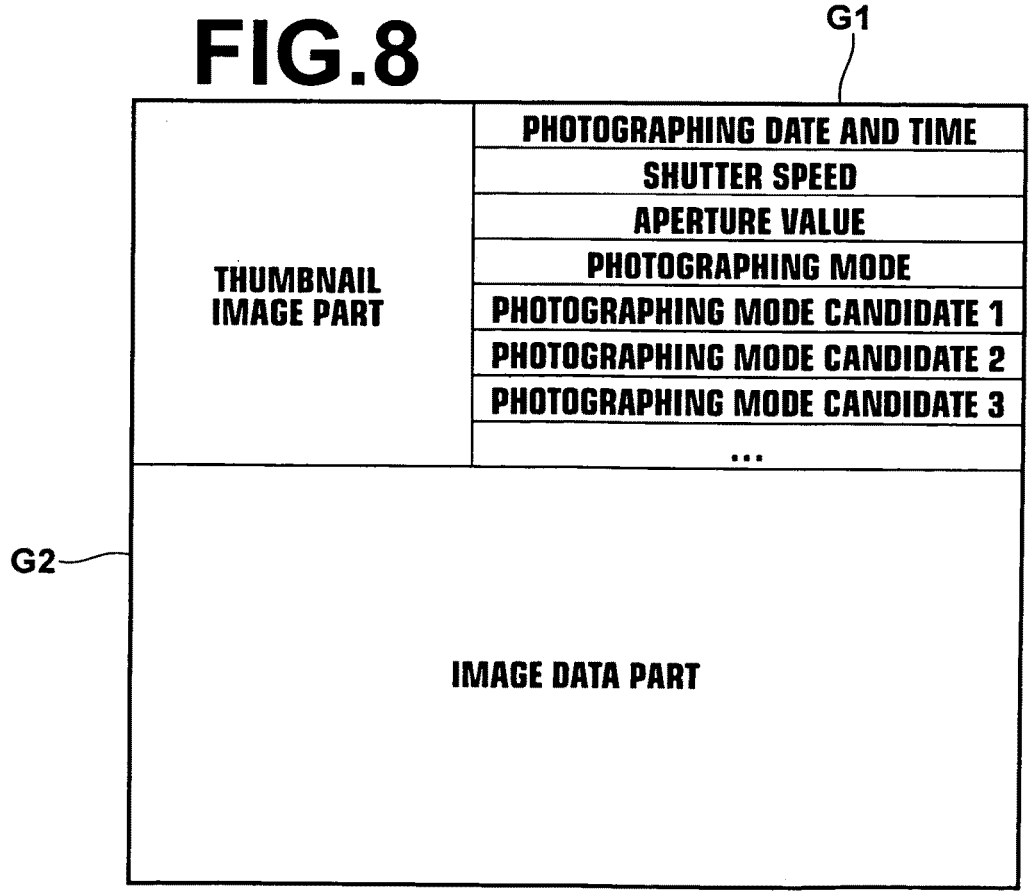
FIG. 8 illustrates the structure of actually-photographed image data according to the first embodiment.

As shown in FIG. 8, the actually-photographed image data is formed by a thumbnail image part G1 and an image data part G2.

The photographing mode candidates selected by the user (such as photographing mode candidates 1-3 shown at G1 in FIG. 8) are added to the thumbnail image part G1. The actually-photographed image data is recorded on the external recording medium 70 together with the photographing modes added thereto.

Figure 9:
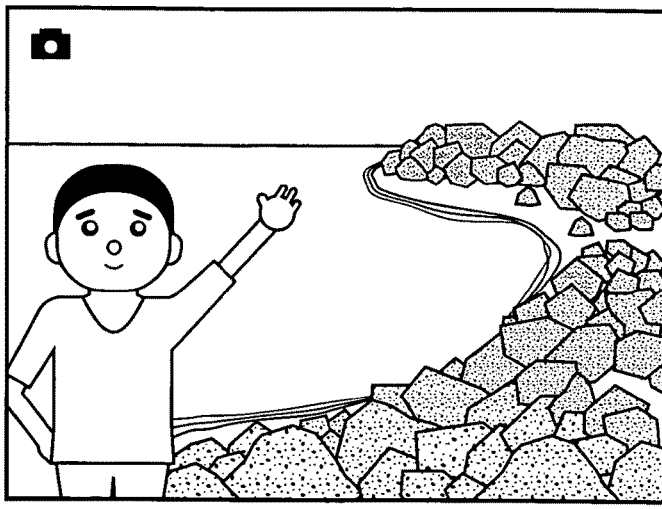
FIG. 9 illustrates certainty factors of scenes according to the first embodiment.

Further, as shown in FIG. 9, a database T1 may be generated from the result obtained through the operations by the scene recognition unit 66 and the photographing mode selection unit 79 and added to the thumbnail image part G1. It is assumed here that a desired image displayed on the monitor 14, as shown in FIG. 9, is recognized as containing, for example, a person, sky, sea, rock, and the like.

It is assumed here that the photographing modes selected by the photographing mode selection unit 79 are photographing modes of "person", "landscape" and "beach" corresponding to the person, the sky and the sea recognized as the scenes by the scene recognition unit 66.

Then, the certainty factors of the respective scenes calculated by the scene recognition unit 66 according to the above-described technique are recorded as scores. For example, a score for the "person" is 60 points, a score for the "sky" is 50 points, and a score for the "sea" is 40 points.

In this manner, the certainty factors of the scenes calculated for the respective scenes analyzed by the scene recognition unit 66 are added as the scores to the thumbnail image part G1.

The photographing mode selection unit 79 can automatically select the photographing mode for the photographing operation in the order of the scene certainty factors from the highest. Thus, the photographing modes are recorded in the thumbnail image part in the order of the scene certainty factors from the highest.

Further, the photographing mode selection unit 79 may allow the user to specify the number of selectable photographing modes for the photographing operation or the number may be set as a default value. In this case, only the specified or predetermined number of photographing modes are selected in the order of the certainty factors from the highest. Thus, even when a single image contains a lot of scenes, the number of scenes can be moderately limited for selection of the photographing modes. This also allows preventing overlap of actually-photographed image data to be played back during a playback operation.

Furthermore, the photographing mode selection unit 79 may select or record only photographing modes that correspond to scenes with certainty factors not less than a predetermined score. In this case, the photographing mode candidates can be narrowed down to only those corresponding to the scenes which are closer to the actual scene, thereby reducing failure in selecting the photographing mode candidates.

Figure 10:
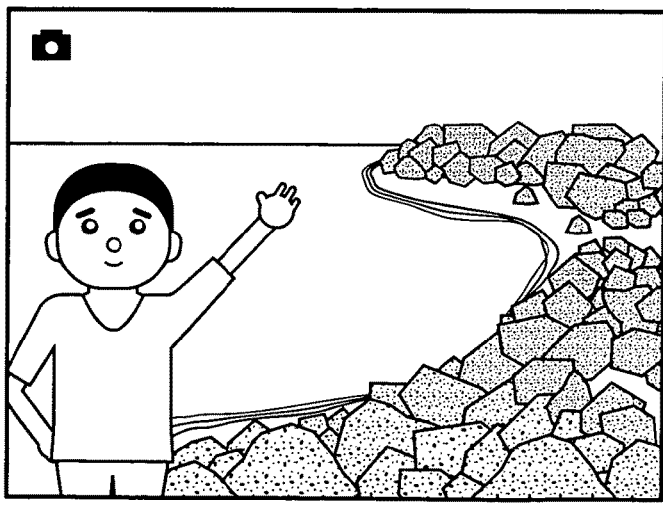
FIG. 10 illustrates component ratios of the scenes according to the first embodiment.

Moreover, as shown in FIG. 10, a database T2 may be generated from the result obtained through the operations by the scene recognition unit 66 and the photographing mode selection unit 79 and added to the thumbnail image part G1. It is assumed here that a desired image displayed on the monitor 14, as shown in FIG. 10, is recognized as containing, for example, a person, sky, sea, rock, and the like.

It is assumed here that the photographing modes selected by the photographing mode selection unit 79 are photographing modes of "person", "landscape" and "beach" corresponding to the person, the sky and the sea recognized as the scenes by the scene recognition unit 66.

Then, certainty factors are recorded as component ratios. For example, the ratio of the "person" is 40%, the ratio of the "sky" is 30%, and the ratio of the "sea" is 20%.

Then, component ratios of the respective scenes recognized by the scene recognition unit 66 to the entire image are calculated and added to the thumbnail image part G1.

Further, parameters for the image processing carried out on the actually-photographed image data (or the live view data) by the image processing unit 67 may be changed according to the component ratios.

In the case of the ratios as shown in FIG. 10, image processing which is preferable both to the "person" and the "landscape" can be provided by setting parameters for the image processing to interpolate between the person mode and the landscape mode.

It should be noted that a single image may be divided into regions of a person, landscape, and the like, and each region may be subjected to the image processing corresponding to each photographing mode.

Now, returning to the flow chart of FIG. 4, as the user sets the power lever 8 to the playback mode for playing back the actually-photographed image data, the actually-photographed image data can be played back on the monitor 14 (step ST6).

Then, the user specifies at least one particular photographing mode from the recorded photographing modes on the GUI generated by the photographing mode specifying unit 80 and displayed on the monitor 14. As the particular photographing mode is specified (step ST7), all the actually-photographed image data photographed in the particular photographing mode can be searched out from the external recording medium 70 or the frame memory 68, and all the actually-photographed image data photographed in the particular photographing mode can be played back on the monitor 14.

The user may specify the particular photographing mode by turning the operation mode dial 11, and the photographing mode specifying unit 80 may specify the particular photographing mode specified by the user for the playback operation.

When the photographing mode is set to an AUTO mode (a mode for automatically selecting the photographing mode) or a normal mode (a mode for selecting the photographing mode according to default setting) during the playback operation, all the actually-photographed image data recorded in the external recording medium 70 may automatically be played back.

The order of the actually-photographed image data to be displayed during the playback operation is the order of the photographing date and time which is recorded in the thumbnail image part. However, the actually-photographed image data may be displayed in the order specified by the user. Further, more than one photographing modes may be specified for the playback operation.

When the photographing mode for the playback operation is specified, only the actually-photographed image data having the scene certainty factors not less than a predetermined score may be displayed on the monitor 14. The predetermined score for the playback operation may be specified by the user via the photographing mode specifying unit 80 or may be set as a default value.

Further, when the photographing mode for the playback operation is specified, only the actually-photographed image data having the scene certainty factors not less than a predetermined component ratio may be displayed on the monitor 14. The predetermined component ratio (percentage) of the scene for the playback operation may be specified by the user or may be set as a default value.

Furthermore, the operation mode dial 11 may be set to the automatic scene recognition continuous-shooting mode, and continuous shooting operations of the number corresponding to the number of selected photographing modes may be carried out for the respective selected photographing modes, and the thus obtained images may be recorded in the external recording medium 70.

It should be noted that, in a case where effects of the selected photographing modes can be obtained by changing the manner of signal processing without carrying out the continuous shooting, the continuous shooting is not carried out and the actually-photographed image data is subjected to signal processing to record the thus obtained pieces of actually-photographed image data for the respective selected photographing modes of the number corresponding to the number of selected photographing modes.

When the automatic scene recognition continuous-shooting mode is set, all the photographing modes selected as the candidates by the photographing mode selection unit 79 may be recorded in the thumbnail image part of each image data. By recording all the photographing mode candidates, images corresponding to all the photographing modes can be recorded even when the user is not sure about an appropriate photographing mode.

Next, a second embodiment of the photographing apparatus of the invention will be described.

Figure 11:
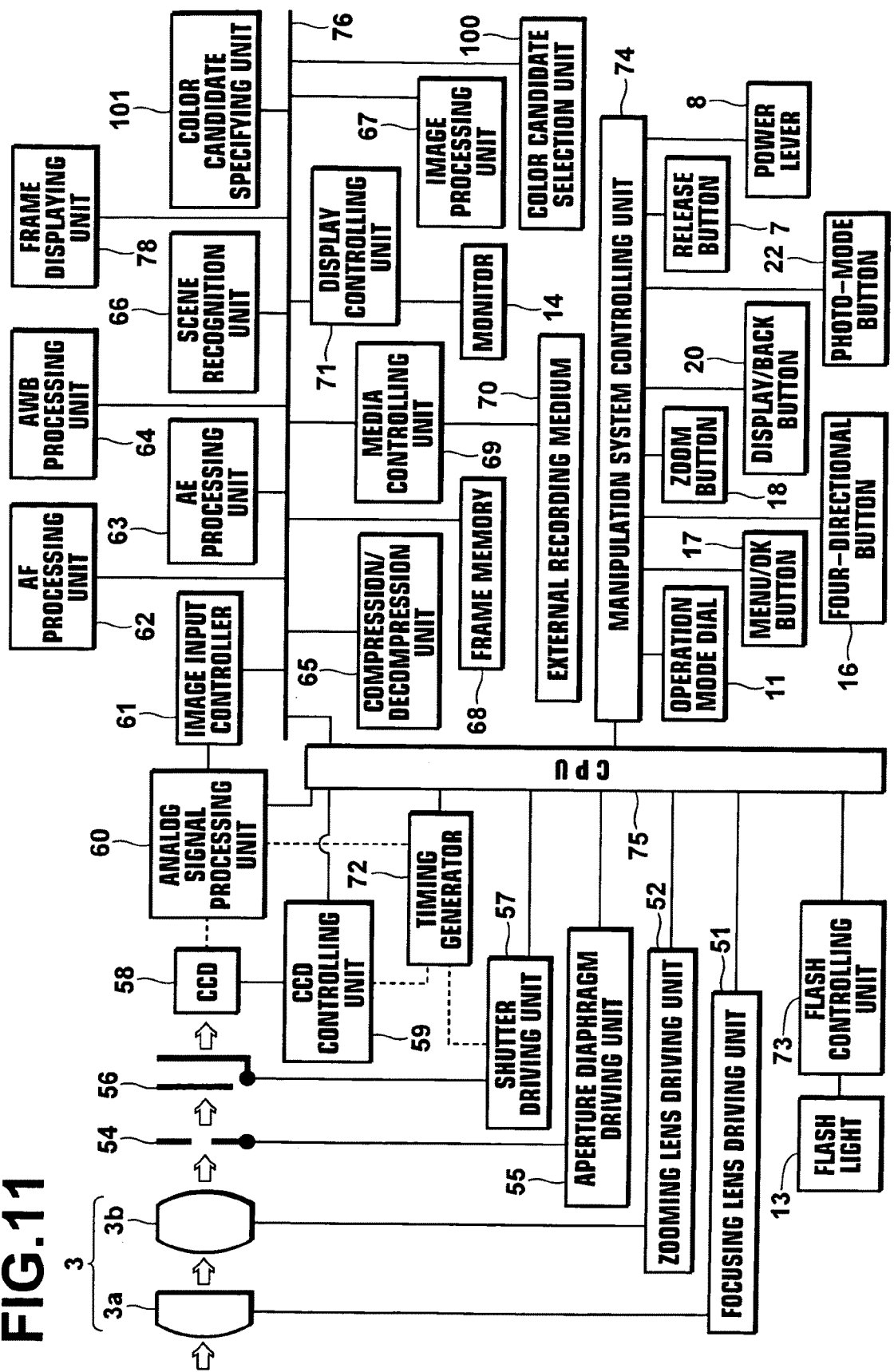
FIG. 11 is a functional block diagram of a digital camera according to a second embodiment.

FIG. 11 is a schematic block diagram illustrating the photographing apparatus according to the second embodiment of the invention which includes a color candidate selection unit 100.

In the following description, only components that are different from the components of the photographing apparatus of the first embodiment are explained, and the components which are the same as those in the above-described embodiment are designated by the same reference numerals and are not explained in detail.

The color candidate selection unit 100 selects one or more color candidates (blue, red, yellow, black, white, violet, light blue, green, orange, etc.) corresponding to the recognized scenes before the actual photographing operation. Color components of the scenes recognized by the scene recognition unit 66 are analyzed, and colors forming the scenes are calculated.

FIG. 12 is a flow chart of a series of operations carried out in the digital camera 1 according to the second embodiment. As shown in FIG. 12, when the operation mode according to the setting of the operation mode dial 11 is the automatic scene recognition mode and the user half-presses the release button 7, the CPU 75 causes the scene recognition unit 66 to carry out the scene recognition.

Then, the scene recognition unit 66 determines whether or not the scene recognition has been successful (step ST11). If the scene recognition has not been successful (step ST11: NO), a usual photographing operation is carried out (step ST13), and the actually-photographed image data is recorded in the external recording medium 70 (step ST14).

In contrast, if it is determined in step ST11 that the scene recognition has been successful (step ST11: YES), the color candidate selection unit 100 detects one or more color candidates to be recommended corresponding to the result of scene recognition by the scene recognition unit 66. Specifically, the scene recognition unit 66 sends the result of scene recognition to the color candidate selection unit 100. The color candidate selection unit 100 has a database of a correspondence relationship between one or more scene recognition results and corresponding one or more color candidates.

The result of scene recognition is analyzed by the color candidate selection unit 100 using the above database, and the like, and the color candidates to be recommended corresponding to the scenes can be detected as shown in FIG. 13.

The color candidate selection unit 100 detects the color candidates to be recommended from the result of scene recognition, and the color candidates to be recommended are displayed on the monitor 14. Displaying the color candidates in this manner helps to reduce the burden on the user in making selection.

The display controlling unit 71 controls display to allow the user to visually check the detected color candidates to be recommended on the live view data. At this time, an indication of the color candidates to be recommended is superimposed on the live view data. For example, icons of the color candidates may be displayed.

Figure 14:
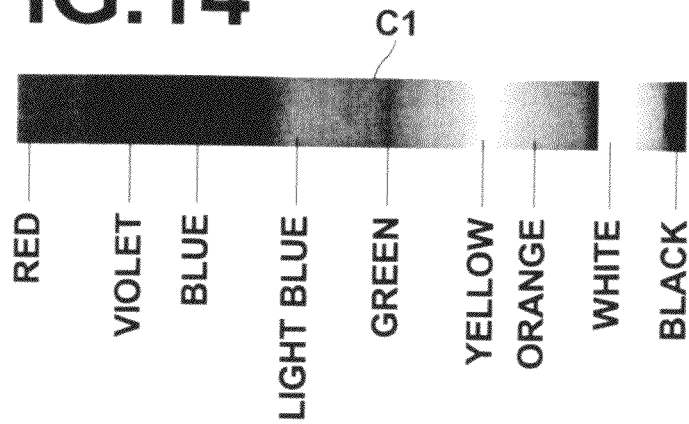
FIG. 14 illustrates color candidates according to the second embodiment.

The icons of the color candidates to be recommend corresponding to the scenes represent colors such as blue, red, yellow, black, white, violet, light blue, green, orange, etc., as shown in the color chart C1 of FIG. 14.

Displaying the icons of the color candidates to be recommended in this manner facilitates visual confirmation by the user.

While the user half-presses the release button 7, the user selects at least one of the color candidates on a GUI, which is generated by the color candidate selection unit 100 and displayed on the monitor 14, by selectively pressing the menu/OK button 17 and the four-directional button 16 (step ST12).

The icons corresponding to the color candidates extracted by the color candidate selection unit 100 may be displayed on the monitor 14 to allow the user to select one or more of them (or select one or more of them by deleting other extracted color candidates). By displaying the icons, or the like, in this manner, the user can carry out actual photographing with visually checking the live view data and also checking which color candidates are extracted and which of them is/are selected.

The user may select the at least one particular color candidate by turning the operation mode dial 11. Alternatively, the digital camera 1 may automatically select the at least one color candidate.

When the release button 7 is fully pressed, the actually-photographed image data is obtained (step ST13).

Figure 15:
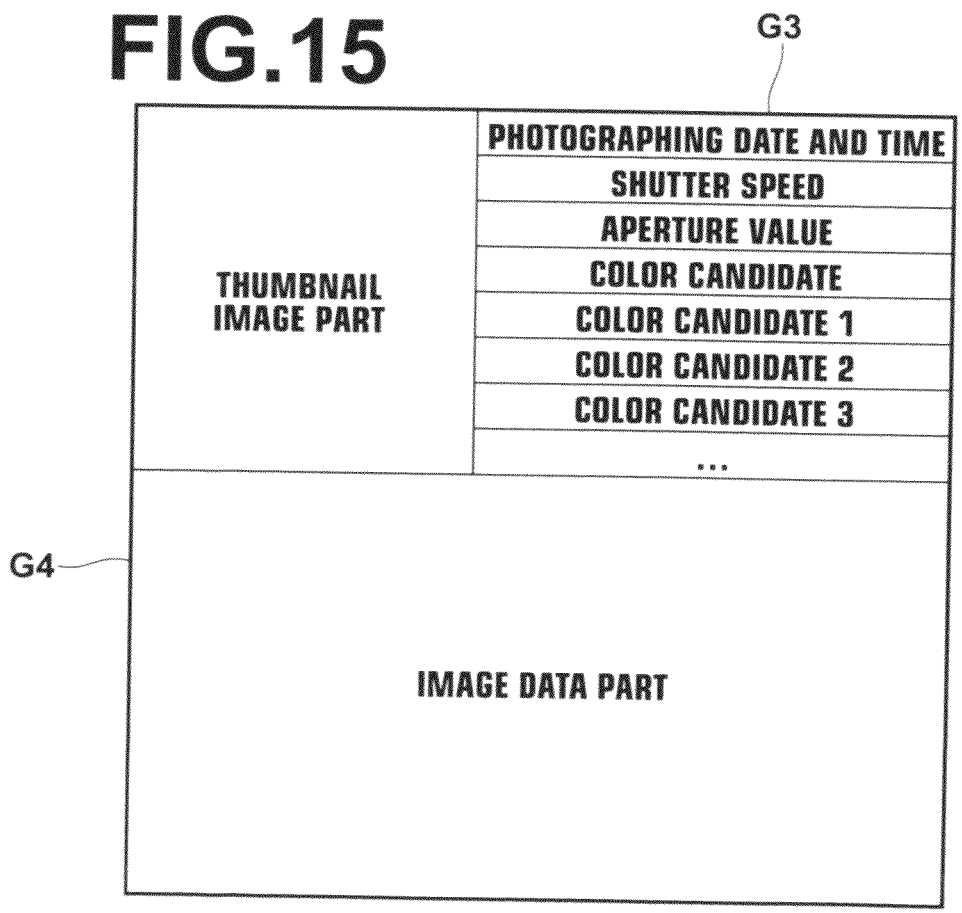
FIG. 15 illustrates the structure of actually-photographed image data according to the second embodiment.

As shown in FIG. 15, the actually-photographed image data is formed by a thumbnail image part G3 and an image data part G4.

The selected color candidates (such as color candidates 1-3 shown at G3 in FIG. 15) are added to the thumbnail image part G3. The actually-photographed image data is recorded on the external recording medium 70 together with the color candidates added thereto.

Figure 16:
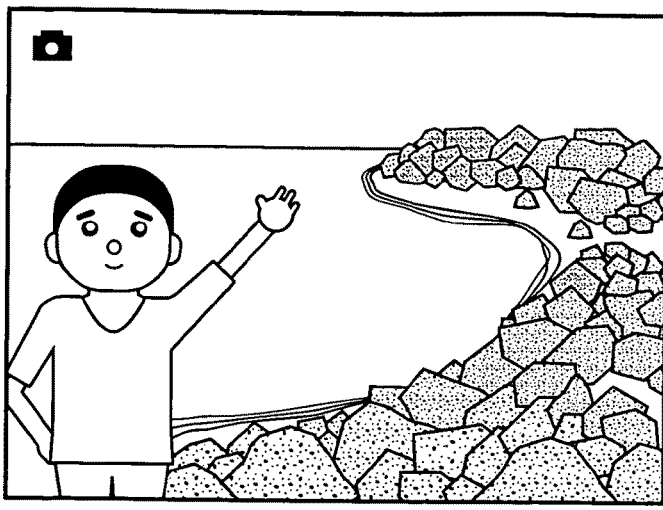
FIG. 16 illustrates certainty factors of colors according to the second embodiment.

Further, as shown in FIG. 16, a database T3 may be generated from the result obtained through the operations by the scene recognition unit 66 and the color candidate selection unit 100 and added to the thumbnail image part G3. It is assumed here that a desired image displayed on the monitor 14, as shown in FIG. 16, is recognized as containing, for example, a person, sky, sea, rock, and the like.

It is assumed here that the color candidates selected by the color candidate selection unit 100 are skin color, blue and black corresponding to the person, the sky and the sea recognized as the scenes by the scene recognition unit 66.

Figure 17:
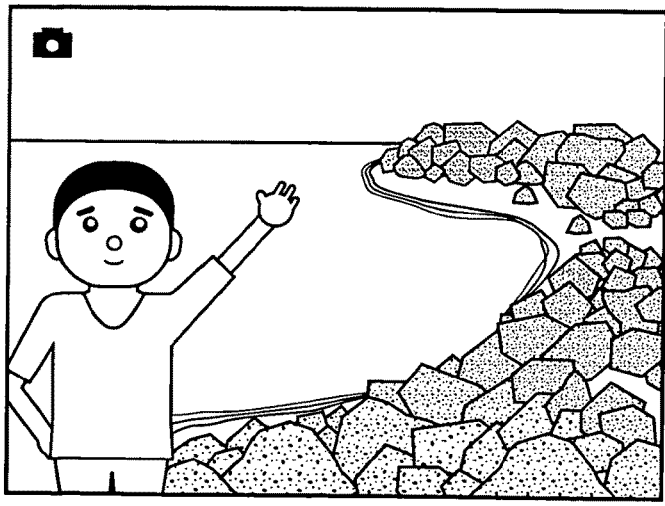
FIG. 17 illustrates component ratios of colors according to the second embodiment.

Then, certainty factors indicating probability of the respective scenes containing the respective colors (color certainty factors) are recorded as scores. For example, scores of the color certainty factors of the scenes are: 60 points for the "person", 50 points for the "sky" and 40 points for the "sea", as shown in FIG. 17.

By recording the scores of the color certainty factors which are calculated for the respective colors analyzed by the color candidate selection unit 100 in this manner, the color candidate selection unit 100 can automatically select the color candidate in the order of the color certainty factors from the highest during photographing. Thus, the color candidates are recorded in the thumbnail image part G3 in the order of the color certainty factors from the highest.

In this manner, highly reliable data of the color certainty factors can be added to the thumbnail image part G3 and recorded.

Further, the user may be allowed to specify the number of selectable color candidates for the photographing operation or the number may be set as a default value. In this case, only the specified or predetermined number of color candidates are selected in the order of the color certainty factors from the highest. Thus, highly reliable data of the color certainty factors can be recorded, thereby avoiding extraneous data being recorded.

The color candidate selection unit 100 may select or record only the color candidates having the color certainty factors not less than a predetermined score, rather than setting the predetermined number of color candidates to be selected.

Further, as shown in FIG. 17, a database T4 may be generated from the result obtained through the operations by the scene recognition unit 66 and the color candidate selection unit 100 and added to the thumbnail image part G3. It is assumed here that a desired image displayed on the monitor 14, as shown in FIG. 17, is recognized as containing, for example, a person, sky, sea, rock, and the like.

It is assumed here that the color candidates selected by the color candidate selection unit 100 are skin color, blue and black corresponding to the person, the sky and the sea recognized as the scenes by the scene recognition unit 66.

Then, component ratios of the respective colors analyzed by the color candidate selection unit 100 to the entire image are calculated and added to the thumbnail image part G3. For example, the component ratios of the color candidates corresponding to the scenes are: 40% for the "person", 30% for the "sky" and 20% for the "sea", as shown in FIG. 17.

Now, returning to FIG. 12, as the user sets the power lever 8 to the playback mode for playing back the actually-photographed image data, the actually-photographed image data can be played back (step ST15).

Then, the user specifies at least one particular color candidate on the GUI generated by the color candidate specifying unit 101 and displayed on the monitor 14. As the particular color candidate is specified (step ST16), all the actually-photographed image data photographed according to the particular color candidate can be searched out from the external recording medium 70, and all the actually-photographed image data photographed according to the particular color candidate can be played back on the monitor 14.

The user may specify the particular color candidate by turning the operation mode dial 11, and the color candidate specifying unit 101 may specify the particular color candidate specified by the user for the playback operation.

When the photographing mode is set to the AUTO mode (the mode for automatically selecting the photographing mode) or the normal mode (the mode for selecting the photographing mode according to default setting) during the playback operation, all the actually-photographed image data recorded in the external recording medium 70 may automatically be played back. In this manner, all the actually-photographed image data recorded in the external recording medium 70 can be played back.

The order of the actually-photographed image data to be displayed during the playback operation is the order of the photographing date and time which is recorded in the thumbnail image part. However, the actually-photographed image data may be displayed in the order specified by the user.

Further, more than one color candidates may be specified for the playback operation.

When the color candidate for the playback operation is specified, only the actually-photographed image data having the color certainty factors not less than a predetermined score may be displayed on the monitor 14. The predetermined score for the playback operation may be specified by the user via the color candidate specifying unit 101 or may be set as a default value.

By displaying on the monitor 14 only the actually-photographed image data having the certainty factors not less than the predetermined score, highly reliable search and playback operations can be achieved.

Further, when the color candidate for the playback operation is specified, only the actually-photographed image data containing the color candidate not less than a predetermined component ratio may be displayed on the monitor 14. The component ratio (percentage) of the color candidate for the playback operation may be specified by the user via the color candidate specifying unit 101 or may be set as a default value.

The actually-photographed image data or the live view data taken by the photographing apparatus of the invention is not limited to still images and may include moving images.

In a case where the live view data represents a moving image, the result of scene recognition by the scene recognition unit 66 may be calculated as an average of results of scene recognition obtained for respective frames forming the live view data. Alternatively, the result of scene recognition may be calculated for each frame. In a case where the actually-photographed image data represents a moving image, the photographing modes or the color candidates selected by the photographing mode selection unit 79 or the color candidate selection unit 100 may be added to each frame forming the actually-photographed image data. Further, one of the photographing modes or one of the color candidates which has the highest total score or ratio in all the frames forming the actually-photographed image data may be added as a representative photographing mode or a representative color candidate.

Although the actually-photographed image data is played back on the monitor 14 of the photographing apparatus of the invention in the above description, the actually-photographed image data may be played back on a display device, such as a television, by connecting the photographing apparatus to the display device via a wired or wireless connection.

While the photographing apparatus of the invention has been described with respect to the digital camera by way of example in the above-described embodiments, the scope of applicability of the invention is not limited to digital cameras. The invention is also applicable to other electronic devices with an electronic photographing function, such as a mobile phone with a camera.

According to a photographing apparatus, a photographing method and a recording medium containing a photographing program of the invention, a photographing mode is selected according to at least one recognized scene, and actually-photographed image data is acquired according to the selected photographing mode. Then, all the actually-photographed image data acquired in a photographing mode which is specified for playing back the actually-photographed image data can be played back. Therefore, the actually-photographed image data can be played back for each scene classification with simple operations.

According to another aspect of the photographing apparatus, the photographing method and the recording medium containing the photographing program of the invention, a color candidate is selected according to at least one recognized scene, and actually-photographed image data is acquired according to the selected color candidate. Then, all the actually-photographed image data acquired according to a color candidate which is specified for playing back the actually-photographed image data can be played back. Therefore, the actually-photographed image data can be played back for each color classification with simple operations.

What is claimed is:

1. A photographing apparatus, comprising:
an imaging unit to acquire live view data and actually-photographed image data representing a subject;
a scene recognition unit to analyze the live view data acquired by the imaging unit and recognize a plurality of scenes representing the subject;
a photographing mode selection unit comprising a database of a correspondence relationship between scene recognition results and corresponding photographing modes defining photographing conditions for the imaging unit, and selecting a plurality of photographing modes corresponding to the plurality of scenes recognized by the scene recognition unit based on the correspondence relationship of the database;
a recording unit to record the plurality of photographing modes selected by the photographing mode selecting unit for each actually-photographed image data when the actually photographed image data are obtained, correlated with the actually-photographed image data acquired by the imaging unit;
a photographing mode specifying unit to specify a photographing mode for playing back the recorded actually-photographed image data; and
a playback controlling unit to search out, from the recording unit, all the recorded actually-photographed image data which are correlated with the photographing mode specified by the photographing mode specifying unit and to control playback such that the searched-out actually-photographed image data are played back,
the imaging unit carrying out continuous shooting operations for a number of images captured in the continuous shooting operations that is equal to a number of photographing modes selected by the photographing mode selection unit, to obtain a plurality of sets of the actually photographed image data, and
the recording unit recording each of the plurality of the actually photographed image data obtained by the imaging unit, correlated with all of the plurality of photographing modes selected by the photographing mode selection unit.

2. The photographing apparatus as claimed in claim 1, wherein the playback controlling unit further exerts control such that the acquired live view data to be displayed, and exerts control to display at least one icon corresponding to the plurality of selected photographing modes superimposed on the live view data.

3. The photographing apparatus as claimed in claim 1, wherein the photographing mode selection unit automatically selects the plurality of photographing modes or selects one or more of the at least one photographing mode according to a selection instruction received from a user.

4. The photographing apparatus as claimed in claim 1, wherein the playback controlling unit exerts control such that all the searched-out actually-photographed image data to be played back in an order of photographing date and time or in an order specified by a user.

5. The photographing apparatus as claimed in claim 1, wherein a scene certainty factor is calculated for each scene analyzed by the scene recognition unit, and the photographing mode selection unit selects the plurality of photographing modes corresponding to one or more of the at least one scene an order of the scene certainty factor from a highest.

6. The photographing apparatus as claimed in claim 5, wherein the photographing mode selection unit selects the at least one photographing mode of a number within a predetermined number.

7. The photographing apparatus as claimed in claim 1, wherein a scene certainty factor is calculated for each scene analyzed by the scene recognition unit, and the photographing mode selection unit selects the plurality of photographing modes corresponding only to one or more of the plurality of scenes having the scene certainty factor not less than a predetermined value.

8. The photographing apparatus as claimed in claim 1, further comprising an image processing unit to apply image processing on the actually-photographed image data according to an image processing condition set based on the plurality of photographing modes selected by the photographing mode selection unit, wherein the image processing unit calculates a component ratio of each of the plurality of selected photographing modes and controls the image processing condition according to the component ratio.

9. The photographing apparatus as claimed in claim 8, wherein the photographing mode specifying unit receives an instruction from a user for setting the component ratio, and
wherein the playback controlling unit allows all the actually-photographed image data acquired in the photographing mode corresponding to the component ratio according to the instruction received by the photographing mode specifying unit to be played back.

10. The photographing apparatus as claimed in claim 1, wherein the imaging unit acquires the actually-photographed image data for each of the selected photographing modes.

11. The photographing apparatus as claimed in claim 1, wherein the photographing conditions defined by the photographing mode include at least one of an automatic exposure and an automatic focusing.

12. The photographing apparatus as claimed in claim 1, wherein the actually-photographed image data comprises a still image.

13. The photographing apparatus as claimed in claim 1, wherein the photographing mode selection unit superimposes an indication of the photographing modes to be recommended on the live view data and displays the live view data with the indication on a screen of the photographing apparatus.

14. The photographing apparatus as claimed in claim 13, wherein the screen of the photographing apparatus displays icons of the photographing modes as designated by a person mode icon, a natural photo mode icon, a party mode icon, and an icon indicating that the photographing apparatus is operating in the photographing mode.

15. The photographing apparatus as claimed in claim 13, wherein the screen of the photographing apparatus displays at least one of icons of the photographing modes as designated by a person mode icon, a natural photo mode icon, and a party mode icon.

16. A method, comprising:
acquiring live view data and actually-photographed image data representing a subject;
analyzing the acquired live view data and recognizing a plurality of scenes representing the subject;
selecting a plurality of photographing modes corresponding to the plurality of recognized scenes based on a correspondence relationship of a database of the correspondence relationship between scene recognition results and corresponding photographing modes defining photographing conditions;
recording the plurality of selected photographing modes selected for each actually-photographed image data when the actually photographed image data are obtained, correlated with the actually-photographed image data acquired in the selected photographing mode;
specifying a photographing mode for playing back the recorded actually-photographed image data; and
searching out all the actually-photographed image data which are correlated with the specified photographing mode and to control playback to play back the searched-out actually-photographed image data,
the acquiring the live view data and the actually-photographed image data carrying out continuous shooting operations for a number of images captured in the continuous shooting operations that is equal to a number of photographing modes selected by the selecting of the plurality of photographing modes to obtain a plurality of sets of the actually photographed image data, and
the recording the plurality of selected photographing modes recording each of the plurality of the actually photographed image data obtained by the acquiring the live view data and the actually-photographed image data, correlated with all of the plurality of photographing modes selected by the selecting of the plurality of photographing modes.

17. A non-transitory recording medium containing a program for causing a computer to carry out a method comprising:
acquiring live view data and actually-photographed image data representing a subject;
analyzing the acquired live view data and recognizing a plurality of scenes representing the subject;
selecting a plurality of photographing modes corresponding to the plurality of recognized scenes based on a correspondence relationship of a database of the correspondence relationship between scene recognition results and corresponding photographing modes defining photographing conditions;
recording the plurality of selected photographing modes selected for each actually-photographed image data when the actually photographed image data are obtained, correlated with the actually-photographed image data acquired in the selected photographing mode;
specifying a photographing mode for playing back the recorded actually-photographed image data; and
searching out all the actually-photographed image data which are correlated with the specified photographing mode and to control playback to play back the searched-out actually-photographed image data,
the acquiring the live view data and the actually-photographed image data carrying out continuous shooting operations for a number of images captured in the continuous shooting operations that is equal to a number of photographing modes selected by the selecting of the plurality of photographing modes to obtain a plurality of sets of the actually photographed image data, and
the recording the plurality of selected photographing modes recording each of the plurality of the actually photographed image data obtained by the acquiring the live view data and the actually-photographed image data, correlated with all of the plurality of photographing modes selected by the selecting of the plurality of photographing modes.

* * * * *